(12) United States Patent
Sautter et al.

(10) Patent No.: US 11,447,094 B2
(45) Date of Patent: Sep. 20, 2022

(54) SEATBELT RETRACTOR AND METHOD FOR CONTROLLING A SEATBELT RETRACTOR

(71) Applicant: TRW Automotive GmbH, Alfdorf (DE)

(72) Inventors: Michael Sautter, Ludwigsburg (DE); Philipp Göltz, Rudersberg-Steinenberg (DE); Markus Däuber, Eislingen/Fils (DE); Marco Braun, Fellbach (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 307 days.

(21) Appl. No.: 16/612,437

(22) PCT Filed: May 17, 2018

(86) PCT No.: PCT/EP2018/062913
§ 371 (c)(1),
(2) Date: Nov. 11, 2019

(87) PCT Pub. No.: WO2018/215288
PCT Pub. Date: Nov. 29, 2018

(65) Prior Publication Data
US 2020/0094775 A1    Mar. 26, 2020

(30) Foreign Application Priority Data

May 24, 2017 (DE) .......................... 102017111398.3

(51) Int. Cl.
*B60R 22/28* (2006.01)
*B60R 22/46* (2006.01)

(52) U.S. Cl.
CPC .......... *B60R 22/4676* (2013.01); *B60R 22/28* (2013.01); *B60R 2022/285* (2013.01);
(Continued)

(58) Field of Classification Search
CPC ................ B60R 22/28; B60R 22/4676; B60R 2022/285; B60R 2022/287; B60R 2022/288; B60R 2022/289
See application file for complete search history.

(56) References Cited

U.S. PATENT DOCUMENTS 6,290,159 B1    9/2001  Specht et al.
6,616,081 B1 *  9/2003  Clute .................... C23C 16/272
                                                          242/379.1
(Continued)

FOREIGN PATENT DOCUMENTS

DE        29622181       5/1991
DE     102006059100       6/2008
(Continued)

*Primary Examiner* — Sang K Kim
(74) *Attorney, Agent, or Firm* — Tarolli, Sundheim, Covell & Tummino LLP

(57) ABSTRACT

A belt retractor comprises a frame (10), a belt reel (12) rotatably arranged in the frame (10) and having a first end (16) and an opposite second end (17) as well as comprising a blocking mechanism (18) arranged at an end face of the belt reel (12) by which the belt reel (12) can be blocked within the frame (10). The belt retractor further comprises an axially extending first load limiter which is releasably coupled to the belt reel (12) by means of a disconnecting clutch (24), a second load limiter which is coupled to be rotationally fixed to the first load limiter or a hub, and a third load limiter which can be coupled to be rotationally fixed to the belt reel (12) by means of a connecting clutch (38). Moreover, a method for controlling such belt retractor is provided.

18 Claims, 6 Drawing Sheets

(52) U.S. Cl.
CPC ... *B60R 2022/287* (2013.01); *B60R 2022/288* (2013.01); *B60R 2022/289* (2013.01)

(56) References Cited

U.S. PATENT DOCUMENTS

| | | | | |
|---|---|---|---|---|
| 7,753,305 | B2* | 7/2010 | Katayama | B60R 22/3413 |
| | | | | 242/379.1 |
| 8,814,074 | B2* | 8/2014 | Moedinger | B60R 22/3413 |
| | | | | 242/379.1 |
| 10,196,034 | B2* | 2/2019 | Sasahara | B60R 22/3413 |
| 2008/0029633 | A1 | 2/2008 | Hiramatsu | |
| 2008/0265080 | A1 | 10/2008 | Braun et al. | |
| 2010/0155519 | A1 | 6/2010 | Moedinger et al. | |
| 2017/0088093 | A1* | 3/2017 | Uchibori | B60R 22/28 |
| 2017/0129452 | A1* | 5/2017 | Uchibori | B60R 22/3413 |
| 2017/0240135 | A1* | 8/2017 | Uchibori | B60R 22/4676 |
| 2017/0349138 | A1* | 12/2017 | Uchibori | B60R 22/46 |
| 2019/0118763 | A1 | 4/2019 | Dacuber et al. | |

FOREIGN PATENT DOCUMENTS

| | | |
|---|---|---|
| DE | 102007057661 | 6/2009 |
| DE | 102008041510 | 3/2010 |

* cited by examiner

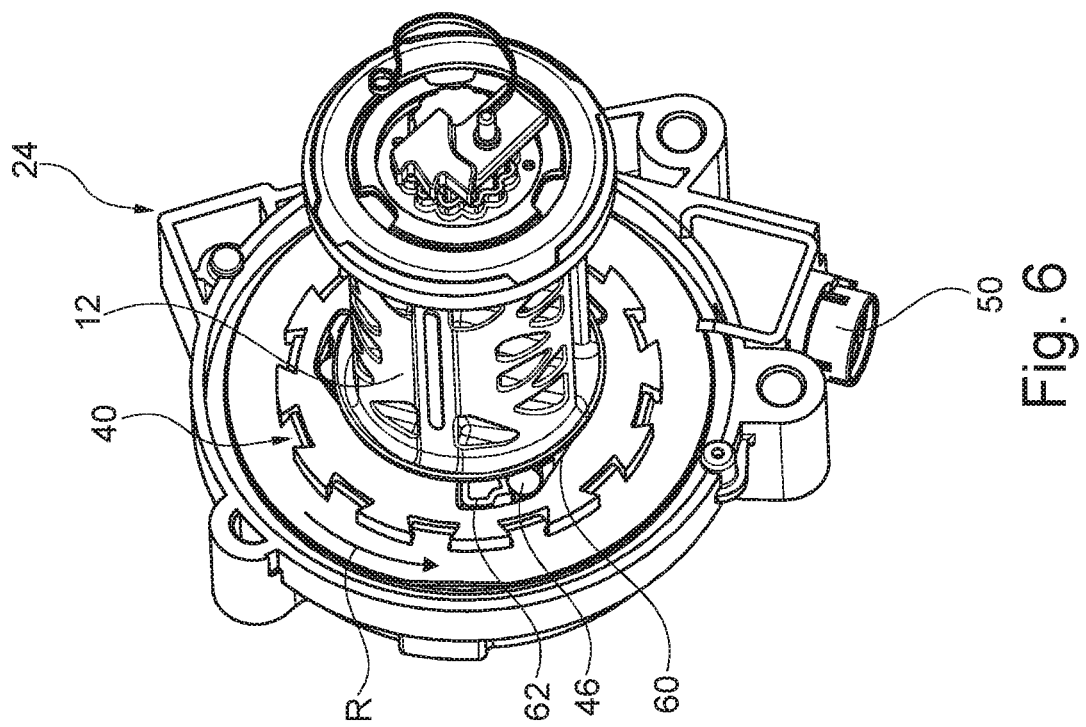
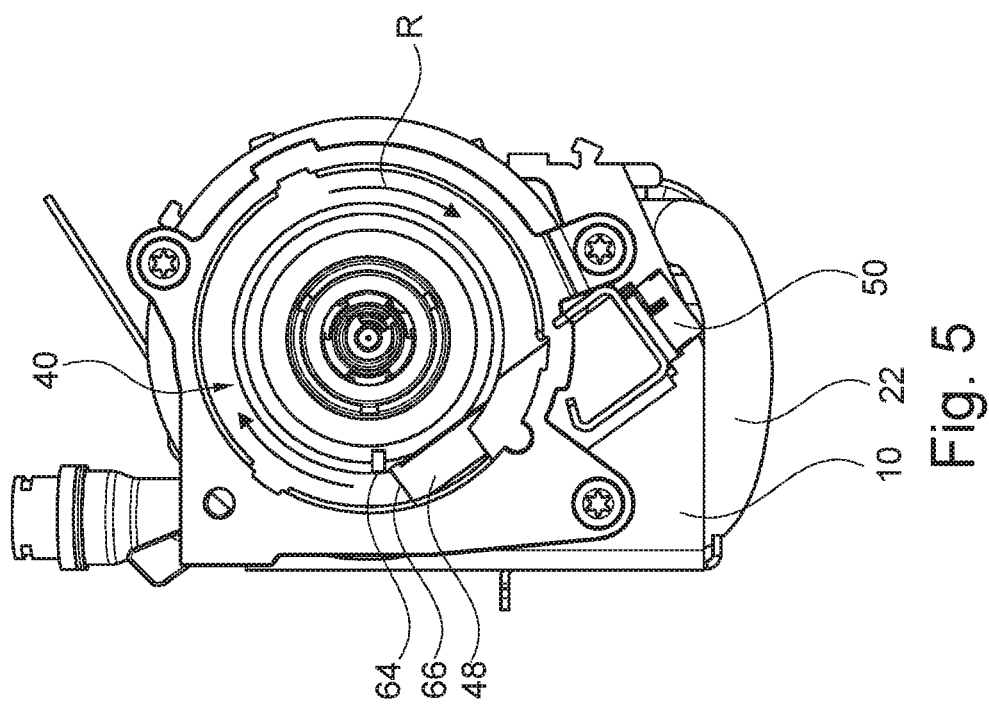

SEATBELT RETRACTOR AND METHOD FOR CONTROLLING A SEATBELT RETRACTOR

RELATED APPLICATIONS

This application corresponds to PCT/EP2018/062913, filed May 17, 2018, which claims the benefit of German Application No. 10 2017 111 398.3, filed May 24, 2017, the subject matter of which are incorporated herein by reference in their entirety.

BACKGROUND OF THE INVENTION

The invention relates to a belt retractor according to claim 1 and a method for controlling such belt retractor according to claim 17.

Belt retractors comprising a controllable load limiter are known. For example, DE 10 2008 063 639 A1 shows such belt retractor. It serves for making a seat belt available to a vehicle occupant of an automotive vehicle. During normal operation, the vehicle occupant can freely extract the seat belt from the belt reel against the action of a winding spring, and the belt reel rewinds the seat belt when the vehicle occupant unbuckles, for example. In response to external parameters such as the deceleration of the vehicle or the rotational acceleration of the belt reel during webbing extraction, the blocking mechanism by which the belt reel can be blocked within the frame is activated.

When the belt reel is blocked within the frame, no more seat belt can be extracted from the belt reel until a predefined load level is reached in the seat belt; the belt reel does not rotate relative to the frame of the belt retractor, apart from minimum yielding which is due to the inherent elasticity of all components present in the flux of force.

When the predetermined load level is reached, the load limiter becomes active. It enables the belt reel to rotate relative to the frame under the action of the tensile force of the seat belt. In this way, a certain amount of seat belt is released which is available as additional path for the deceleration of the vehicle occupant.

The load limiter used here usually is a torsion rod which at one end is coupled to be rotationally fixed to the belt reel and at the other end is coupled to be rotationally fixed to the frame.

Up-to-date belt retractors usually include a second load limiter the load level of which is switched when the afore-described load limiting phase is completed. Even in the second phase of load limitation a particular amount of seat belt can be extracted the belt reel. The load required for this purpose in the seat belt is below the load during the first load limiting phase, however, in which the two load limiters are usually active in parallel so that it adds up the load level thereof.

The two load limiting phases normally are adapted to each other so that the first load limiting phase enables a forward movement of the thorax of the vehicle occupant until it contacts an airbag and the second load limiting phase enables the thorax of the vehicle occupant to immerse into the airbag.

In the belt retractor known from DE 10 2008 063 639 A1 cited in the beginning, the second load limiter is formed by the corrugated disk which can be clamped between two corrugated surfaces and can be rotated relative to the latter so that it has to "meander" between the two corrugated surfaces.

SUMMARY OF THE INVENTION

It is the object of the invention to carry out the belt retractor with additional flexibly selectable load levels.

The features according to claim 1 and claim 17 lead to achieving the object. Advantageous configurations are described in the subclaims.

For achieving the object, a belt retractor comprising a frame as well as a belt reel rotatably arranged in the frame and having a first end and an opposite second end is provided. The belt retractor further comprises a blocking mechanism arranged at an end face of the belt reel by which the belt reel can be blocked within the frame, an axially extending first load limiter, especially a torsion rod which is releasably coupled to the belt reel, especially the first end of the belt reel, by means of a disconnecting clutch. The belt retractor further comprises a second load limiter, especially a first corrugated disk, which is coupled to be rotationally fixed to the first load limiter or a hub of the belt retractor, and a third load limiter, especially a second corrugated disk, which can be coupled to be rotationally fixed to the belt reel by means of a connecting clutch. The torsion rod forms a first load limiter, the first corrugated disk forms a second load limiter and the second corrugated disk forms a third load limiter. Each load limiter provides a restraining force counteracting the extraction of the respective webbing of the belt retractor. Via the disconnecting clutch which is preferably disposed at an end of the belt reel opposed to the blocking mechanism, the first load limiter can be uncoupled, thus preventing it from providing restraining force to the total restraining force. By means of the connecting clutch, the third load limiter can be coupled, thus causing its restraining force to be connected and to be added to the other restraining forces to form the total restraining force. The second load limiter is permanently coupled and constantly makes its restraining force available. Depending on which load limiters are coupled or uncoupled, different load levels are provided. Furthermore, different load curves can be made available by coupling or uncoupling particular load limiters at fixed points in time. In this way, for different conditions, such as body weight of the vehicle occupant or crash intensity, specific load levels with particular load curves may be provided to make available an adapted restraining force. Moreover, by using three load limiters an especially high total restraining force can be provided, when all of the three load limiters are coupled and the respective restraining forces thereof add up.

The second and/or the third load limiter(s) is/are preferably arranged on one of the two end faces of the belt reel. Preferably, the second and/or the third load limiter has/have a larger expansion in the radial direction than in an axial direction. Due to the expansion substantially in the radial direction, the advantage that only very little space is required in the axial direction for the second and/or the third load limiter is resulting. In addition, inside the belt reel no further construction space is required apart from the construction space for the first load limiter.

Of preference, also the infeed clutch has a larger expansion in the radial direction than in the axial direction, thus equally requiring little construction space only. Preferably, the radial expansion of the second and/or third load limiter(s) and/or the infeed clutch is smaller than or equal to a radial expansion of the frame of the belt retractor starting from the shaft of the belt reel. Thus, the infeed clutch and the third load limiter as well as the second load limiter can be integrated in a belt retractor without substantially increasing the construction space of the belt retractor.

The second load limiter, especially in the form of the first corrugated disk, may be connected to the second end of the belt reel. "Connected" in this context means that the first corrugated disk is in contact with the belt reel such that rotating the corrugated disk relative to the belt reel results in friction between the corrugated disk and the belt reel and/or in deformation of the corrugated disk and/or the belt reel so that in the known way a load limiter providing restraining force is formed. This offers the advantage that the torsion rod to which the first corrugated disk is coupled to be rotationally fixed is connected to both the first and the opposite second end of the belt reel when the torsion rod is coupled to the belt reel. In this way, the loads acting on the belt reel are distributed, which allows the strain on the belt retractor to be reduced.

The third load limiter, especially in the form of the second corrugated disk, may be disposed at the first end of the belt reel. In this way, when the connecting clutch is closed, both at the first and at the opposite second end of the belt reel a corrugated disk is coupled to the belt reel which acts as a load limiter. In this manner, in the case of restraint advantageous load distribution is provided which may result in lower strain of the belt reel and, resp., of the belt retractor.

The connecting clutch may comprise a clamping roller clutch. Clamping roller clutches are space-saving and show little susceptibility to failure, which allows the belt retractor to have an especially compact and reliable design.

The connecting clutch may comprise an actuator adapted to be adjusted between an initial position in which the clamping roller clutch is opened and a lifting position in which the clamping roller clutch is closed. In the closed position of the clamping roller clutch, the second corrugated disk is coupled to be rotationally fixed to the belt reel, whereas in the open position the second corrugated disk is uncoupled from the belt reel. By means of the actuator, the third load limiter in the form of the second corrugated disk thus can be connected via the clamping roller clutch, which helps to increase the total restraining force when needed.

The clamping roller clutch may include a cage having a radially outwardly projecting operating journal. The actuator interacts with the operating journal so that by means of the cage the clamping roller clutch is transferred to the closed position via the operating journal, when the actuator is adjusted from the initial position to the lifting position. In this way, the linear movement of the actuator results in rotation of the cage, thus causing the clamping roller clutch to be closed.

The actuator may include a recess into which the operating journal immerses upon rotation of the cage when the actuator is in the lifting position, so that interaction of the operating journal with the actuator is excluded in the lifting position. In this way, rotation of the cage is not obstructed by the actuator in the lifting position. The recess may especially be a groove the cross-section of which corresponds at least to the cross-section of the journal. Alternatively, the actuator may comprise an L-shaped piston, for example, wherein the recess is formed by the space enclosed by the two legs of the L.

The disconnecting clutch may comprise at least one load-transmitting bar which is arranged on the belt reel and is held by a support ring in a coupling position, wherein the support ring can be moved by means of an actor from a supporting position to a release position. Said configuration helps to design the disconnecting clutch in an especially compact manner.

The first load limiter, especially in the form of the torsion rod, may be coupled to the belt reel in an initial condition of the belt retractor. Thus, the restraining force of the first load limiter in the form of the torsion rod in the initial condition adds up to the total restraining force. The initial condition is especially the basic condition during driving which determines the conditions at least at the beginning of a case of restraint.

The belt retractor may provide load limitation with a force of up to 12 kN. According to one embodiment, the belt retractor may provide load limitation with a restraining force of 10 kN, with the torsion rod providing a restraining force of 4 kN, the first corrugated disk providing a restraining force of 2 kN and the second corrugated disk providing a restraining force of 4 kN.

In accordance with the invention, for achieving the aforementioned object also a method for controlling a belt retractor according to the invention in the case of restraint is provided, comprising the following step:

a) the third load limiter preferably being in the form of a second corrugated disk is coupled to be rotationally fixed to the belt reel.

In this way, the entire restraining force is increased in step a) by the restraining force of the third load limiter in the form of the second corrugated disk so that from that point in time higher total restraining force is provided.

The method further may comprise the following step:

b) the first load limiter preferably being in the form of a torsion rod is uncoupled from the belt reel.

Accordingly, the total restraining force is reduced by the restraining force of the first load limiter in the form of the torsion rod so that from that point in time lower total restraining force is provided.

Step b) may be carried out following step a). Thus, the total restraining force is first increased by the restraining force of the second corrugated disk and is then reduced by the restraining force of the torsion rod. In this way, at first high total restraining force can be provided with all of the three load limiters which then will be reduced.

Step b) may be carried out before step a). Thus, the total restraining force is first reduced to the restraining force of the first corrugated disk and then is increased by the restraining force of the second corrugated disk. In this way, at first low total restraining force can be provided which then will be increased to the restraining force of the two corrugated disks.

BRIEF DESCRIPTION OF THE DRAWINGS

Further advantages and features will be evident from the following description in combination with the attached drawings, wherein:

FIG. 5 shows in a side view the third load limiter of FIG. 1 comprising the clamping roller clutch and the actuator in a lifting position, FIG. 6 shows in a perspective view the third load limiter and the belt reel of the belt retractor of FIG. 1 comprising the clamping roller clutch in the closed condition, each of FIGS. 7 to 9 shows in a perspective view the third load limiter of FIG. 5 comprising the actuator in a lifting position and a cage of the clamping roller clutch in various positions, and each of FIGS. 10 to 13 shows a diagram of the acting webbing load over the length of extracted webbing.

DESCRIPTION

Figure 1:
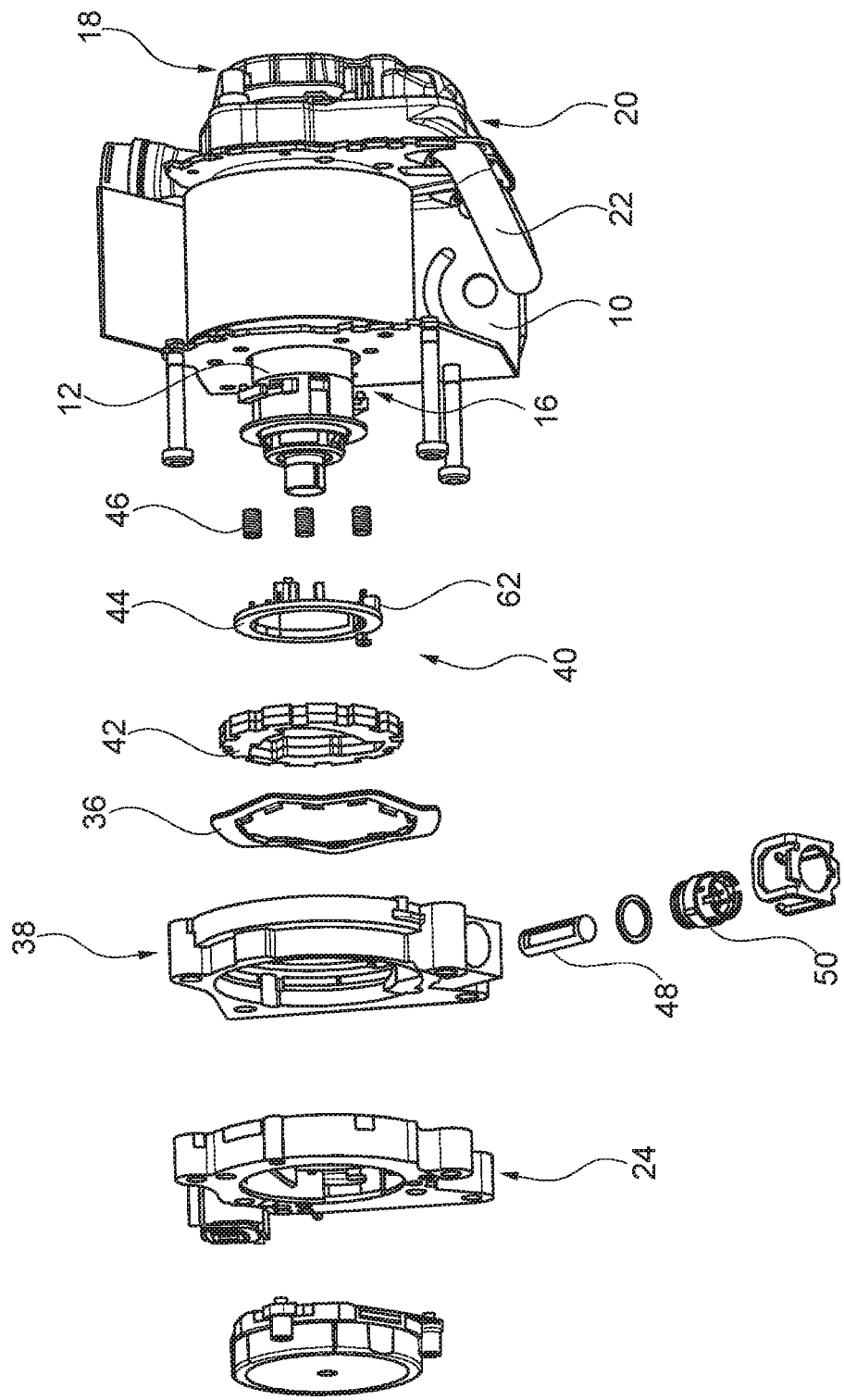
FIG. 1 shows in an exploded view a belt retractor according to the invention comprising first, second and third load limiters.
Figure 2:
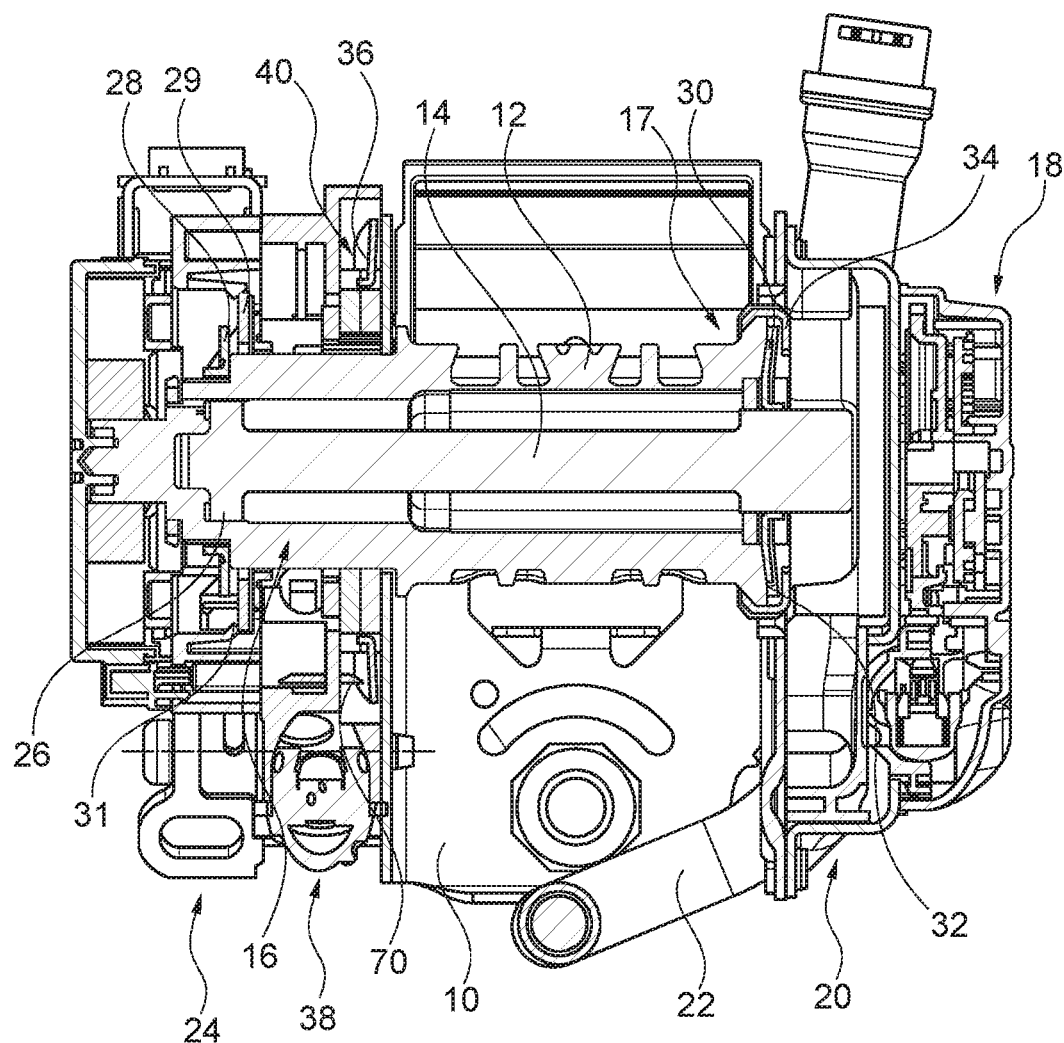
FIG. 2 shows in a sectional view the belt retractor of FIG. 1.

By way of FIGS. 1 and 2, the general structure of the belt retractor is initially illustrated.

The belt retractor includes a frame 10 as self-supporting component in which a belt reel 12 is arranged.

A torsion rod 14 which is the core component of a first load limiter extends through the belt retractor. The torsion rod 14 is assigned to the belt reel 12 at a first end 16 and is received in a hub (not shown) at the opposite second end 17 in a rotationally fixed manner. At the hub there is arranged a blocking mechanism 18 not described in detail here which serves for blocking the hub and thus the torsion rod 14 relative to the frame 10 in a rotationally fixed manner where needed.

The first end 16 of the belt reel 12 is formed by the entire portion of the belt reel 12 which extends away from the frame 10 in the axial direction (to the left in the figure).

Also, a drive unit 20 which may comprise a so-called pre-tensioner, e.g. an electric motor, and a main tensioner, in the shown example configuration a main tensioner with a pyrotechnic charge in a piston 22 as drive element, is connected to the hub in a rotationally fixed manner.

The effects of the pre-tensioner and the main tensioner are generally known and therefore will be explained only roughly here. The pre-tensioner serves for rotating the belt reel 12 in the winding direction, where needed, so that the webbing is tightened up to a certain pre-tensioning load. This operation is reversible. The main tensioner serves for driving the belt reel 12 in the winding direction, where needed, such that within the webbing a significantly higher tensioning load is achieved. The main tensioner can be activated merely once.

At the first end 16 of the belt reel 12 the belt retractor includes a disconnecting clutch 24 by means of which the torsion rod 14 is releasably coupled to the first end 16 of the belt reel 12. The structure and the functioning of the disconnecting clutch 24 are known from DE 10 2016 106 303 (there referred to as actuating drive) which is referred to in this context and thus is deemed to be part of this application to the full extent. Hereinafter, the disconnecting clutch 24 therefore will be explained only roughly.

At its end assigned to the first end 16 of the belt reel 12, the torsion rod 14 is provided with an engaging tooth system 26 in which the points of plural bars (not shown) engage, with the bars being arranged in corresponding recesses of the belt reel 12. There, the bars are held by a support ring 28 that is fixed to the belt reel 12 by means of a holder (not shown).

When a torque is exerted on the belt reel 12, for example by pulling the seat belt, said torque is transmitted via the edges of the recesses and the bars to the torsion rod 14 and from there into the hub. Assuming that the hub is blocked to be rotationally fixed relative to the frame 10, also the belt reel 12 cannot rotate relative to the frame 10, in any case as long as the acting torque is below the torque at which the torsion rod 14 is plastically twisted.

In order to disconnect the coupling between the belt reel 12 and the torsion rod 14, the support ring 28 can be displaced in the axial direction until it will no longer support the bars in the axial direction.

For this purpose, the disconnecting clutch 24 includes a lifting ring 29 which is rotatably received in the housing of the disconnecting clutch 24. The lifting ring 29 includes plural radially orientated contact edges along its outer periphery which are provided for interacting with lifting ramps that are arranged in the housing. When the lifting ring 29 is rotated relative to the lifting ramps, the contact edges will slide along the lifting ramps so that the lifting ring 29 is adjusted in the axial direction.

For adjusting the lifting ring 29, a so-called micro-gas generator is provided which may be e.g. an igniter for the "big" gas generator, as it is used for deployment of a driver or passenger airbag. Basically, also any gas generator which produces the desired amount of compressed gas within the desired period of time may be used.

When the micro-gas generator is ignited, the lifting ring 29 performs an axial stroke due to the lifting ramps, namely in the axial direction outwardly away from the frame 10. With said stroke the support ring 28 is adjusted in the axial direction so far that the action of retaining arms 31 is overcome and the support ring 28 is outside the bars, when viewed in the axial direction.

In this condition of the support ring 28, the bars may deflect outwardly in the radial direction, when a torque is transmitted between the belt reel 12 and the torsion rod 14 so that the torsion rod 14 is uncoupled from the first end 16 of the belt reel. This means that the torsion rod 14 cannot be plastically twisted any longer and thus no restraining force is provided by the first load limiter.

At the second end 17 of the belt reel 12, a first corrugated disk 30 is arranged which is a central component of the second load limiter. The first corrugated disk 30 is coupled to be rotationally fixed to the torsion rod 14 at the end thereof being assigned to the hub and is elastically clamped in the axial direction between an end face 32 of the belt reel 12 and a cover 34.

The first corrugated disk 30 may be rotated between the belt reel 12 and the cover 34 when the acting torque is higher than a holding torque of the first corrugated disk 30 which is composed of a friction component and a resistance of the first corrugated disk 30 against deformation. Load limiters comprising corrugated disks are sufficiently known. For further information about the structure, again reference is made to DE 10 2016 106 303 which is fully referred to in this context.

With regard to the second load limiter, the path way extends from the belt reel 12 to the first corrugated disk 30 and from the first corrugated disk 30 into the torsion rod 14.

At the first end 16 of the belt reel 12, a second corrugated disk 36 is arranged which is a central component of a second load limiter. Between the frame 10 and the disconnecting clutch 24 a connecting clutch 38 is provided by means of which the second corrugated disk 36 can be coupled to be rotationally fixed to the belt reel 12.

The connecting clutch 38 comprises a clamping roller clutch 40 having a blocking disk 42, a cage 44 and plural clamping rollers 46 as well as an actuator 48 having a drive 50.

The drive 50 may include a micro-gas generator or a pyrotechnic charge.

Figure 4:
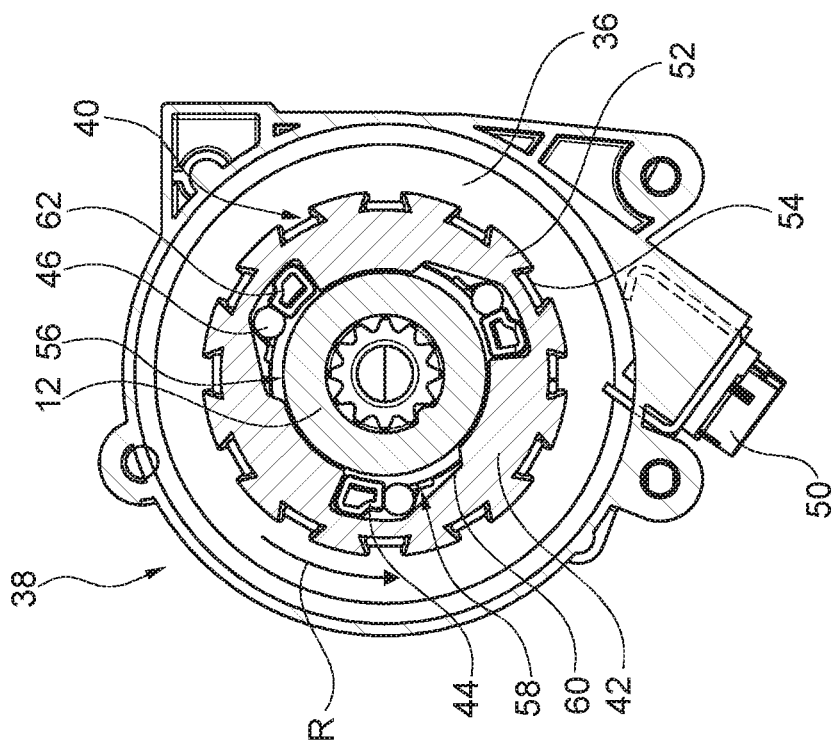
FIG. 4 shows in a sectional view the third load limiter of FIG. 3 comprising the clamping roller clutch in the open condition.

The design of the connecting clutch 38 will be described in the following by way of FIGS. 3 and 4 which show the connecting clutch 38 in an initial position and the clamping roller clutch 40 in an open position.

The blocking disk 42 includes at its outer periphery dovetail-type coupling elements 52 which are in positive mesh with corresponding dovetail-type coupling elements 54 at the inner periphery of the second corrugated disk 36. In this way, the second corrugated disk 36 is coupled to be rotationally fixed to the blocking disk 42.

In the interior, the annular blocking disk 42 has a through-hole 56 through which the belt reel 12 extends in the axial direction as well as plural recesses 58 each having a ramp-shaped taper 60 in a direction of rotation R.

The cage 44 has plural actuating journals 62 each extending in the axial direction into a recess 58, with a clamping roller 46 being arranged in each recess 58 between the tapers 60 and the actuating journals.

In the shown embodiment, each clamping roller clutch 40 has three clamping rollers 46, actuating journals 62 and recesses 58. In an alternative embodiment, the clamping roller clutch 40 may have a different number of said elements.

The cage 44 and the clamping rollers 46 are supported with play, i.e. loosely, within the blocking disk 42.

Figure 3:
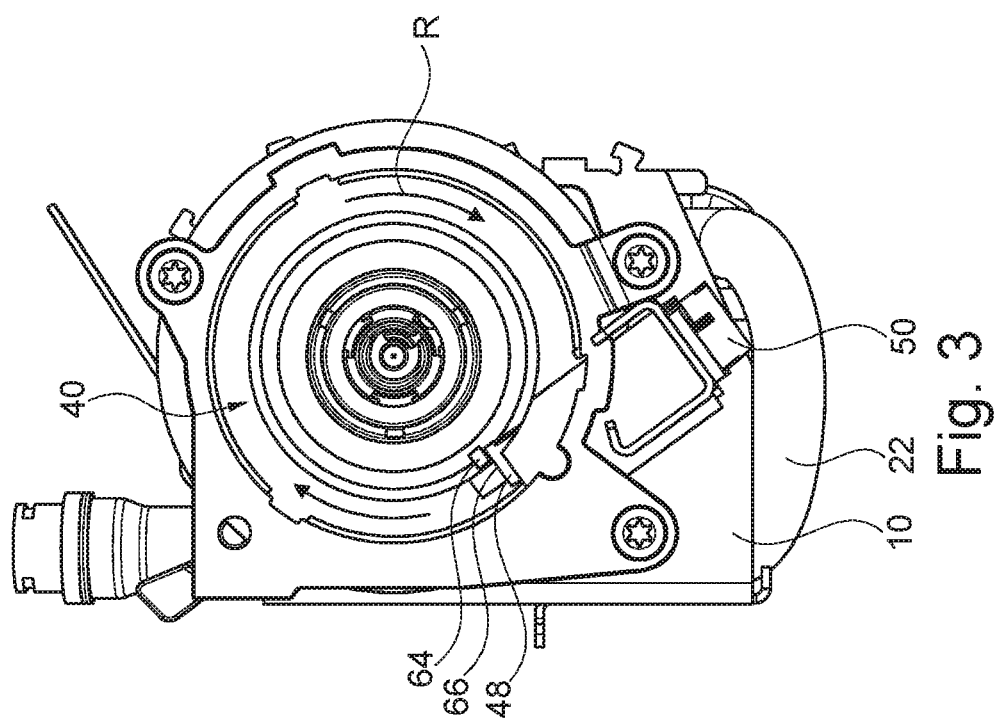
FIG. 3 shows in a side view the third load limiter of FIG. 1 comprising a clamping roller clutch and an actuator in an initial position.

As is evident from FIG. 3, the cage 44 has a radially outwardly projecting actuating journal 64 (see also FIGS. 7 to 9) which in the initial position abuts on an axial end 66 of the actuator 48 against the direction of rotation R.

In order to close the clamping roller clutch 40, the actuator 48 is adjusted from the initial position (see FIG. 3) to a lifting position (see FIG. 5) by means of the drive 50. During said adjustment, the actuator 48 is telescoped in the axial direction and by its axial end 66 entrains the actuating journal 64, thus causing the cage 44 to be rotated in the direction of rotation R. Said rotation of the cage 44 results in the actuating journals 62 urging the clamping rollers 46 into the tapers 60 (see FIG. 6) and finally clamping the clamping rollers 46 with the belt reel 12, thus causing the second corrugated disk 36 to be coupled to be rotationally fixed to the belt reel 12.

Figure 9:
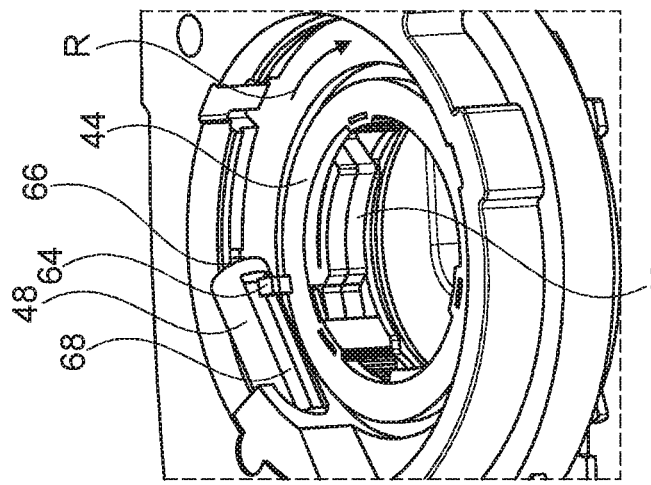
Figure 8:
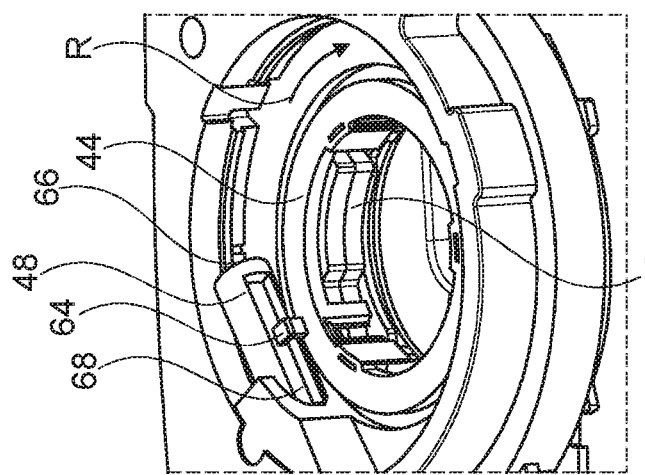
Figure 7:
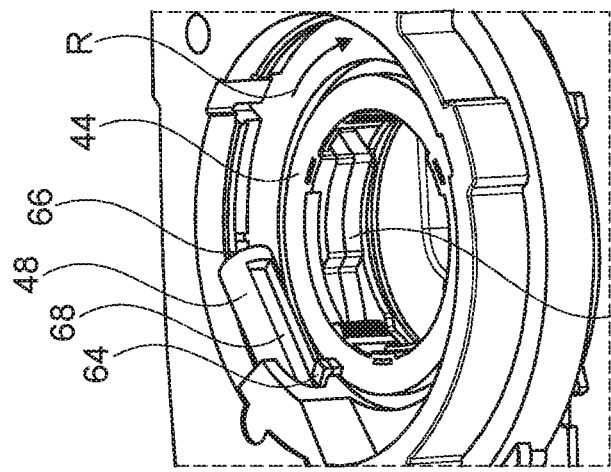

The actuator 48 is cylinder-shaped and has a recess 68 in the form of a groove (see FIGS. 7 to 9). The recess 68 is provided on the side facing the cage 44 and is configured so that in the lifting position no contact is possible between the actuating journal 64 and the actuator 48. As is evident from FIGS. 7 to 9, the actuating journal 64 is in no position blocked by the actuator 48 so that the clamping roller clutch 40 may rotate unhindered.

When the second corrugated disk 36 is coupled to the belt reel 12, the second corrugated disk 36 rotates jointly with the belt reel 12. In order to enable the second corrugated disk 36 to act as the third load limiter, a braking means formed of one or more braking elements 70 (see FIG. 2) is provided. The braking elements 70 abut at least in portion on the second corrugated disk 36 in the axial direction and obstruct rotation of the second corrugated disk 36 by a holding torque that is composed of a friction component and a resistance of the second corrugated disk 36 against deformation. The second corrugated disk 36 therefore is rotated only when the acting torque is higher than the holding torque.

The braking elements 70 are provided in the connecting clutch 38 in this embodiment. Alternatively, or additionally, the braking elements 70 may be fastened on the frame 12, for example.

The belt retractor thus includes three load limiters:

the first load limiter which is formed by the torsion rod 14 and which provides a first restraining force $F_1$ each time the disconnecting clutch 24 is closed, the second load limiter which comprises the first corrugated disk 30 and permanently provides a second restraining force $F_2$, and the third load limiter which comprises the second corrugated disk 36 and provides a third restraining force $F_3$ each time the connecting clutch 38 is closed.

Depending on how the individual load limiters are switched, the restraining forces $F_1$, $F_2$, $F_3$ add up to a total restraining force acting at a particular point in time.

The restraining force $F_1$ of the torsion rod amounts to approx. 4 kN, the restraining force $F_2$ of the first corrugated disk amounts to approx. 2 kN and the restraining force $F_3$ of the second corrugated disk amounts to approx. 4 kN. In this way, the belt retractor can provide a maximum total restraining force of 10 kN.

In an alternative embodiment, the load limiters may provide other than the afore-mentioned restraining forces $F_1$, $F_2$, $F_3$. In this way, the belt retractor can provide a maximum total restraining force of up to 12 kN.

By means of the disconnecting clutch 24 and the connecting clutch 38, different total restraining forces can be provided at different points in time.

By way of the FIGS. 10 to 13, in the following four load curves are used as examples of the numerous possible load curves.

In the initial condition, always both the first load limiter and the second load limiter are active, whereas the third load limiter is inactive.

Figure 10:
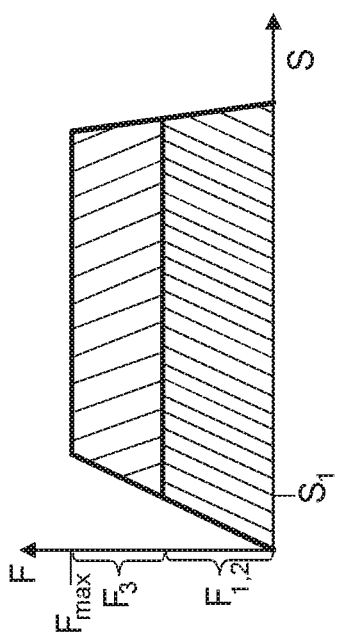

In FIG. 10, with a webbing extraction of $s_1$ the third load limiter is connected so that from this point in time all load limiters will act in parallel and provide a total restraining force corresponding to the sum of the restraining forces $F_1$, $F_2$, $F_3$ of 10 kN.

In this way, right from the beginning and for the entire case of restraint the maximum restraining force of 10 kN can be provided.

Figure 11:
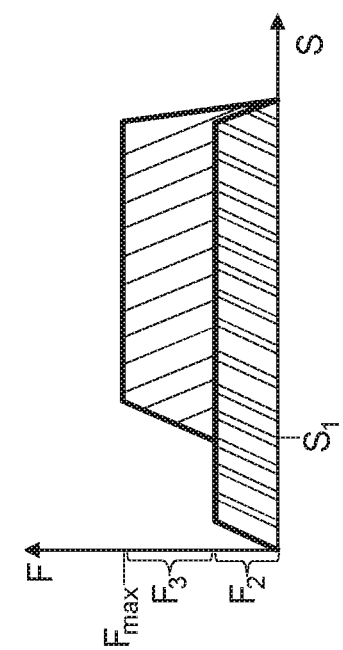

In FIG. 11, just at the beginning the first load limiter is uncoupled so that, for the time being, only the second load limiter providing a restraining force $F_2$ of 2 kN is active. With a webbing extraction $s_1$ the third load limiter is connected so that from this point in time the second and third load limiters will act in parallel and provide a total restraining force of 6 kN.

In this way, at the beginning a low restraining force can be provided which then will be increased to a mean value.

Figure 12:
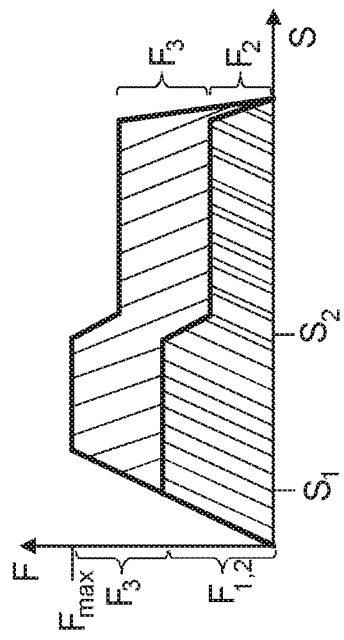

In FIG. 12, with a webbing extraction of $s_1$ the third load limiter is connected so that from this point in time all load limiters will act in parallel and provide the maximum restraining force of 10 kN. With a webbing extraction of $s_2$, the first load limiter is uncoupled so that from this point in time only the second and third load limiters will act in parallel and provide a total restraining force of 6 kN.

In this way, right from the beginning the maximum total restraining force can be provided which is then lowered to a mean value.

Figure 13:
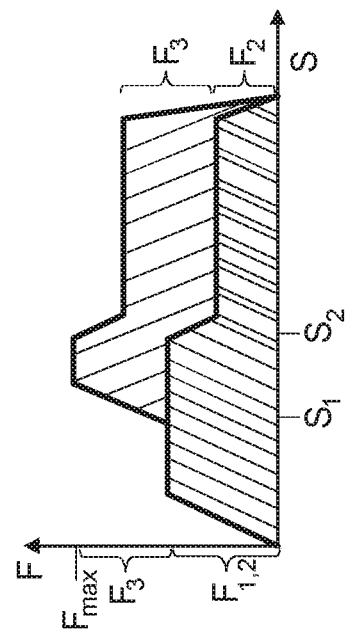

The load curve shown in FIG. 13 corresponds to the switching method of FIG. 12, but the third load limiter is connected with a short delay.

In this way, first a mean restraining force of 6 KN is provided. Subsequently, the total restraining force is increased to the maximum total restraining force of 10 kN and is finally lowered to a low restraining force of 6 kN.

Despite three different load limiters, the belt retractor according to the invention offers a compact constructional design and can provide a plurality of different load curves which may be individually adapted to the vehicle occupant.

The invention claimed is:

1. A belt retractor comprising:
   a frame (10),
   a belt reel (12) rotatably arranged in the frame (10) and including a first end (16) and an opposite second end (17),
   a blocking mechanism (18) arranged on an end face of the belt reel (12) by which the belt reel (12) can be blocked within the frame (10),
   an axially extending first load limiter which is releasably coupled to the belt reel (12) by means of a disconnecting clutch (24),
   a second load limiter which is coupled to be rotationally fixed to the first load limiter or to a hub,
   and a third load limiter which can be coupled to be rotationally fixed to the belt reel (12) by means of a connecting clutch (38),
   wherein the second force limiter comprises a first corrugated disk (30), and wherein the third load limiter comprises a second corrugated disk (36).

2. The belt retractor according to claim 1, wherein the first load limiter comprises a torsion rod (14), the torsion rod (14) being releasably coupled to the first end (16) of the belt reel (12) via the disconnecting clutch (24).

3. The belt retractor according to claim 1, wherein the disconnecting clutch (24) is arranged at the first end (16) of the belt reel (12) opposed to the blocking mechanism (18).

4. The belt retractor according to claim 1, wherein the second load limiter is connected to the second end (17) of the belt reel (12).

5. The belt retractor according to claim 1, wherein the third load limiter is arranged at the first end (16) of the belt reel (12).

6. The belt retractor according to claim 1, wherein the first corrugated disk (30) is coupled to be rotationally fixed to the torsion rod (14).

7. The belt retractor according to claim 1, wherein the connecting clutch (38) comprises a clamping roller clutch (40).

8. The belt retractor according to claim 7, wherein the connecting clutch (38) comprises an actuator (48) which can be adjusted between an initial position in which the clamping roller clutch (40) is opened and a lifting position in which the clamping roller clutch (40) is closed.

9. The belt retractor according to claim 8, wherein the clamping roller clutch (40) includes a cage (44) having a radially outwardly projecting actuating journal (64), wherein the actuator (48) interacts with the actuating journal (64) such that the clamping roller clutch (40) is transferred to the closed position by means of the cage (44) via the actuating journal (64), when the actuator (48) is adjusted from the initial position to the lifting position.

10. The belt retractor according to claim 9, wherein the actuator (48) includes a recess (68) into which the actuating journal (64) immerses during rotation of the cage (44) when the actuator (48) is in the lifting position so that interaction of the actuating journal (64) with the actuator (48) is excluded in the lifting position.

11. The belt retractor according to claim 1, wherein the disconnecting clutch (24) comprises at least one load-transmitting bar arranged on the belt reel (12) and being held by a support ring (28) in a coupling position, wherein the support ring (28) can be moved from a supporting position to a release position by an actuator.

12. The belt retractor according to claim 1, wherein the first load limiter is coupled to the belt reel (12) in an initial condition of the belt retractor.

13. The belt retractor according to claim 1, wherein the third load limiter is not coupled to the belt reel (12) in an initial condition of the belt retractor.

14. The belt retractor according to claim 1, wherein the belt retractor can provide load limitation with a restraining force of up to 12 kN wherein the first load limiter provides a restraining force ($F_1$) of approx. 4 kN, the second load limiter provides a restraining force ($F_2$) of 2 kN and the third load limiter provides a restraining force ($F_3$) of approx. 4 kN.

15. A method for controlling a belt retractor according to claim 1, in the case of restraint, comprising the following step:
   a) The third load limiter is coupled to be rotationally fixed to the belt reel (12).

16. The method according to claim 15, wherein the method comprises the following step:
   b) the first load limiter is uncoupled from the belt reel (12).

17. The method according to claim 16, wherein step b) is carried out following step a).

18. The method according to claim 16, wherein step b) is carried out before step a).

* * * * *